US007419019B1

(12) United States Patent
White et al.

(10) Patent No.: US 7,419,019 B1
(45) Date of Patent: Sep. 2, 2008

(54) POWER ASSIST APPARATUS FOR USE WITH A HOSPITAL BED

(75) Inventors: Mike White, Conroe, TX (US); Barry W. Bearden, Houston, TX (US)

(73) Assignee: Safe-T-Care Manufacturing, Co., Inc., Houston, TX (US)

( * ) Notice: Subject to any disclaimer, the term of this patent is extended or adjusted under 35 U.S.C. 154(b) by 208 days.

(21) Appl. No.: 11/387,120

(22) Filed: Mar. 23, 2006

(51) Int. Cl.
*B62D 51/04* (2006.01)
*A47C 21/00* (2006.01)
*B62D 61/12* (2006.01)

(52) U.S. Cl. ......................... 180/19.3; 5/510; 180/19.1; 280/43.17

(58) Field of Classification Search ..................... 5/600, 5/620, 510, 503.1, 658; 180/65.1, 11, 13, 180/209, 65.5, 908; 280/43, 43.17, 43.18, 280/43.19–43.23
See application file for complete search history.

(56) References Cited

U.S. PATENT DOCUMENTS

| | | | | |
|---|---|---|---|---|
| 3,876,024 | A | 4/1975 | Shieman et al. | |
| 5,513,406 | A | 5/1996 | Foster et al. | |
| 5,580,207 | A | 12/1996 | Kiebooms et al. | |
| 6,725,956 | B1 | 4/2004 | Lemire | |
| 6,729,421 | B1 | 5/2004 | Gluck et al. | |
| 6,834,402 | B2 | 12/2004 | Hanson et al. | |
| 6,871,714 | B2 | 3/2005 | Johnson | |
| 6,902,019 | B2 * | 6/2005 | Heimbrock et al. | 180/65.5 |
| 7,191,854 | B2 * | 3/2007 | Lenkman | 180/65.1 |
| 2002/0084116 | A1 | 7/2002 | Ruschke et al. | |
| 2004/0159473 | A1 * | 8/2004 | Vogel et al. | 180/9.1 |

* cited by examiner

*Primary Examiner*—Patricia Engle
*Assistant Examiner*—Jonathan J Liu
(74) *Attorney, Agent, or Firm*—Egbert Law Offices

(57) ABSTRACT

A power-assist apparatus for use with hospital beds has at least one drive wheel interconnected to a frame of the hospital bed so as to be movable between a first position in which the drive wheel is positioned in spaced relationship to an underlying surface and a second position in which the drive wheel resiliently contacts the underlying surface. A controller is cooperative with the drive wheel so as to move the drive wheel between the first and second positions. A motor is drivably connected to the drive wheel. A handle is connected to the frame of the bed so as to extend upwardly and outwardly therefrom. The handle has control mechanisms for controlling the drive wheel and the motor.

14 Claims, 4 Drawing Sheets

POWER ASSIST APPARATUS FOR USE WITH A HOSPITAL BED

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to hospital beds having motor drives. More particularly, the present invention relates to power assist devices that can be integrated into the structure of a hospital bed so as to allow a hospital bed to move within the hospital environment.

BACKGROUND OF THE INVENTION

Currently, most hospital beds, specialized beds, and patient transfer beds (hereinafter "hospital beds") are moved manually by people. Hospital beds are moved with regularity, because there is less physical effort required to move the entire bed than to lift the patient off the bed, onto a gurney bed, and then move the patient and gurney bed to another room, where they must again lift them back onto a bed. Due to the weight of the typical hospital bed, the force required to move the bed through long corridors, up and down ramps, or over carpeting requires the application of force that exceeds a safe workload. As a result, a significant number of injuries occur to persons that move hospital beds each year. A typical hospital bed weighs between 400 and 2000 pounds, depending on the style of the bed and the weight of the patient in the bed.

Under current procedures associated with moving hospital beds, the mover pushes on the edges of the bed mattress or on handles located on the headboard or footboard of the bed. All of these must be above waist level (approximately four feet above ground level). This pushing requires the mover to use the legs, hips, back, arms and hands. These areas of the body can be susceptible to injury from over-exertion. These injuries can cause lost work time and long-term health problems for the movers, and they cause added expenses for the hospitals. The persons that will typically move the hospital beds are often nurses. Such movement of these hospital beds can contribute to already high rate of nurse workplace injuries. This is typically not a task that nurses enjoy.

Presently, there is a very great demand for the use of bariatric beds. These bariatric beds are constructed so as to withstand a weight of an extremely heavy person thereon. Certain of these bariatric hospital beds have the capacity to handle patients having a weight of up to 1,200 pounds. The popularity of the bariatric surgery procedures has contributed to an increased demand for such bariatric beds. Whenever these bariatric beds have the very heavy person positioned thereon, the difficulty in moving the hospital bed from one location to another is exacerbated.

There is a need in the art for an electrically-powered hospital bed drive apparatus so as to facilitate and assist in the moving of hospital beds in the hospital environment. These power-driven hospital beds must work in conjunction with a wide range of hospital beds presently in existence and eliminate much of the physical force required to move and steer the beds safely.

In the past, various patents have issued relating to such power-assist devices for hospital beds. For example, U.S. Patent Publication No. 2002/0084116, published on Jul. 4, 2002 to Ruschke et al., describes a motorized propulsion system for a bed. The propulsion system is detachably coupled to a patient support to permit storage of the propulsion system or use on the propulsion system on multiple patient supports. In particular, the propulsion system is a separate hand-held device that has a motorized pair of wheels connected to a bottom thereof. Suitable hitching mechanisms are provided on the device so as to allow the device to be directly connected to a frame of a hospital bed.

U.S. Patent Publication No. 2004/1034692, published on Jul. 15, 2004 to Kime et al., describes a freestanding self-propelled device for moving hospital beds. The device includes a chassis having a lower frame portion and an upper frame portion. A single motor-driven drive wheel is centrally located between the lateral end of the chassis and coupled to the chassis so as to be pivotal about a substantially vertical axis. The drive wheel is located between sets of support wheels coupled to the lower frame portion of the chassis.

U.S. Pat. No. 3,876,024, issued on Apr. 8, 1975 to Shieman et al., shows a motorized vehicle for moving hospital beds. This vehicle includes telescoping wheeled carriage assemblies that are dimensioned to fit under a hospital bed. The first carriage assembly includes a traction wheel which is driven by a battery-powered electric motor. This second carriage assembly supports brackets for rigidly attaching the vehicle to a bed. A removable, tiltable control handle is used for operating the electric motor through a control circuit.

U.S. Pat. No. 5,513,406, issued on May 7, 1996 to Foster et al., discloses a modular hospital bed and method of patient handling. Various bed handling devices are described for use in detachable connection to the frame of the bed.

U.S. Pat. No. 5,580,207, issued on Dec. 3, 1996 to Kiebooms et al., shows a device for moving beds that includes a movable frame, a lifting mechanism that can cooperate with the underframe of a bed, and a steering mechanism.

U.S. Pat. No. 6,725,956, issued on Apr. 27, 2004 to G. Lemire, provides a fifth wheel for a bed. This fifth support assembly has a frame with a plurality of floor-engaging wheels mounted thereon. A housing is configured for movement relative to the frame. A spring mechanism is oriented between the frame and the housing so as to continually urge the housing toward the floor. An auxiliary wheel is mounted for rotation on an axle secured to the housing. A drive motor mechanism is provided and is fastened between the frame and the housing to effect a raising and a lowering of the housing and the auxiliary wheel mounted thereon.

U.S. Pat. No. 6,729,421, issued on May 4, 2004 to Gluck et al., shows a motor-assist gurney unit. This unit includes a gurney, a detachable power unit for propelling the gurney and a docking unit. The motor-assisted unit is usable with a plurality of gurneys. The unit includes a power supply having a plurality of sockets which are adapted to engage one of a plurality of engagement pins. The power unit is steerable and includes a power supply, at least one drive wheel, a drive system, a steering column with handlebars attached substantially perpendicular thereto, and a plurality of idler wheels.

U.S. Pat. No. 6,834,402, issued on Dec. 28, 2004 to Hanson et al., teaches a combination bed mover and patient transfer apparatus. The patient transport apparatus includes a patient support mover configured to move a patient support relative to the floor and a patient transfer apparatus configured to move a patient from a first position on the patient support to a second position on the patient support.

U.S. Pat. No. 6,871,714, issued on Mar. 29, 2005 to D. Johnson, provides a hospital bed power-assist device. This device comprises a body, a motor-driven wheel coupled to the body, and a hitch coupled to the body and adapted for engaging the hospital bed.

It is an object of the present invention to provide a power-assist device for a hospital bed which allows the hospital worker to move the bed in a controlled and efficient manner.

It is another object of the present invention to provide a power-assist device for a hospital bed that allows the hospital worker to move the hospital bed in a safe manner.

It is still a further object of the present invention to provide a power assist device for a hospital bed that is easy to attach to existing hospital beds.

It is a further object of the present invention to provide a motor assist device for a hospital bed that facilitates the use and manipulation of bariatric beds within the hospital environment.

It is still a further object of the present invention to provide a power assist device for a hospital bed that has wheels that resiliently contract the underlying floor and adapt to undulations in the underlying surface.

It is still a further object of the present invention to provide a power assist device for a hospital bed which is easy to use, relatively inexpensive, and easy to manufacture.

These and other objects and advantages of the present invention will become apparent from the reading of the attached specification and appended claims.

BRIEF SUMMARY OF THE INVENTION

The present invention is a power-assist apparatus for a hospital bed that comprises a hospital bed having a frame extending therebelow and wheels rotatably mounted thereto, at least one drive wheel interconnected to the frame and movable between a first position which the drive wheel is positioned in spaced relationship to the floor and a second position in which the drive wheel resiliently contacts the floor, a controller cooperative with the drive wheel so as to move the drive wheel between the first second positions, and a motor drivably connected to the drive wheel.

In the present invention, a support structure affixed to the frame of the bed. The motor is affixed to the support structure. The drive wheel is rotatable relative to the support structure. The support structure includes a channel member affixed to a cross-member of the frame of the bed, a panel pivotally connected to the channel member, and an actuator means cooperative with the channel member and the channel. The actuator means serves to move the panel and the drive wheel between the first and second positions. The actuator means includes a housing pivotally connected to one end of the channel member and a piston actuator positioned in the housing. The piston extends outwardly of the housing. The piston has an end opposite the housing received by a surface of the panel. A spring extends between housing and the surface of the panel so as to resiliently contact the surface of the panel. The piston is in slidable relationship to the surface of the panel. The spring resiliently urges the panel pivotally downwardly relative to the frame of the bed such that the drive wheel is in the second position. The piston is generally freely slidable through the surface of the panel. The piston includes a drive piston extending outwardly of the housing, a support flange affixed to the end of the drive piston opposite the housing, and a pair of rods affixed to a side of the support flange opposite the drive piston. The pair of rods extend in generally parallel relationship to each other. The spring comprises a pair of springs extending respectively over and along the pair of rods. The surface of the panel includes a flange surface extending upwardly from the panel at an end opposite the channel member. This flange surface has a pair of holes formed therein. The pair of rods respectively extend through this pair of holes. The pair of springs respectively bear against the flange surface.

In the present invention, the drive wheel comprises a pair of wheels extending outwardly on opposite sides of the panel. The actuator is a lead screw drive actuator. The motor is a DC brush motor. The motor is connected to the drive wheels such that a multiple rotation of the motor causes a single rotation of the drive wheels when the drive wheels are in the second position.

The controller of the present invention includes a handle connected to frame of the bed. The controller is affixed to an upper end of the handle. The controller is electrically connected to the motor. The handle is pivotally connected at a lower end thereof to the frame of the bed so as to move between a vertical orientation and a non-vertical orientation. The handle includes a first member having an end affixed to the frame of the bed and extending generally horizontally outwardly therefrom, a second member pivotally connected to an end of the first member opposite the frame, and a spring means connected to the first and second members for resiliently urging the second member toward the vertical orientation. The controller is affixed to an end of the second member opposite the first member.

In the present invention, the controller includes a paddle member pivotally connected to the handle. This paddle member is pivotally connected so as to cause the drive wheels to be rotated by the motor in one direction or another direction. The controller can also include a switch means positioned at the upper end of the handle. This switch means serves to stop a rotation of the drive motor by the motor when the switch means is contacted by an exterior surface. The controller has a key actuator mounted at the upper end of the handle. The key actuator can be manipulated so as to turn the power assist on and off. A bumper is mounted to the handle at the pivotal connection of the first member with the second member. The present invention also includes an electric power supply that is mounted on the frame of the bed. This power supply is electrically connected to the motor and to the controller. The power support is a 24 volt power supply in which two 12 volt batteries are mounted in series.

DETAILED DESCRIPTION OF THE INVENTION

Figure 1:
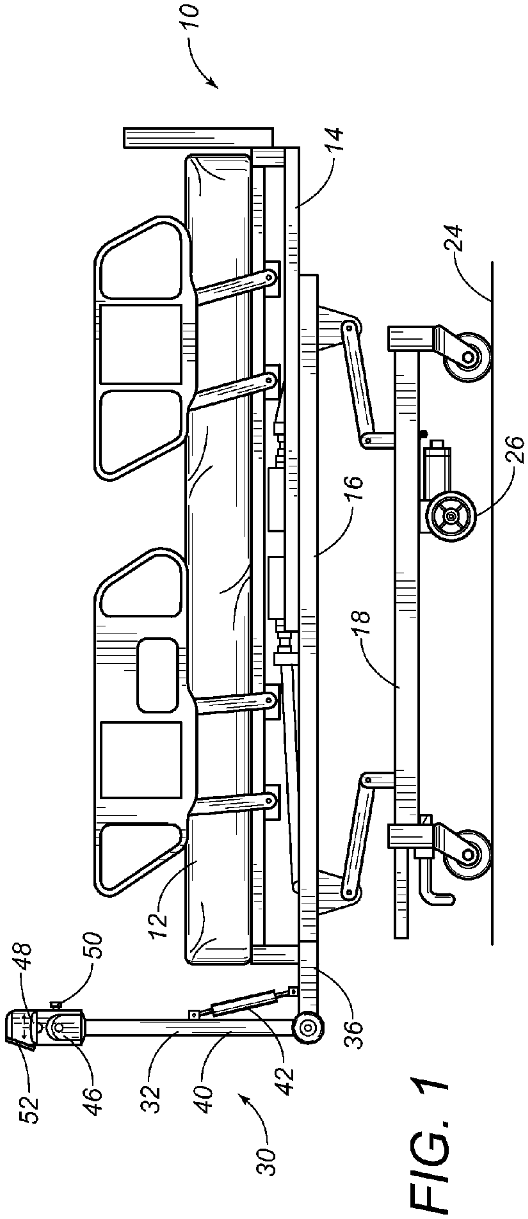
FIG. 1 is a side elevational view showing the hospital bed of the present invention with the drive wheels in the upper position.
Figure 2:
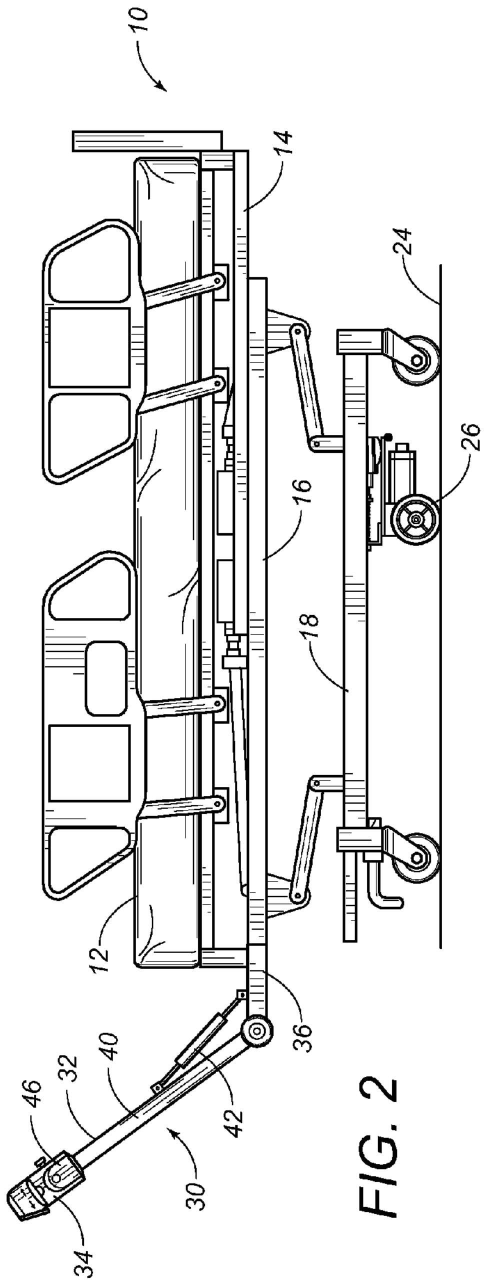
FIG. 2 is a side elevational view of the hospital bed of the present invention with the drive wheels in a lower position.

Referring to FIG. 1, there is shown the power assist hospital bed 10 in accordance with the teachings of the present invention. The hospital bed 10 includes a bed 12 that is supported by a frame 14. The bed 12, along with the frame 14 are in the nature of a conventional hospital bed. In particular, the bed 12 and the frame 14 can be similar to existing bariatric beds that are used to accommodate oversized patients. The frame 14 of the hospital bed 10 includes the upper bed-supporting portion 16 and a lower frame 18. Suitable mechanisms 20 can be manipulated by various motors so as to raise and lower the upper frame 16 with respect to lower frame 18. A plurality of wheels 22 are rotatably mounted on the lower frame 18 so as to support the frame 14 upon an underlying surface 24, such as the floor of a hospital. Importantly, in the present invention, drive wheels 26 are interconnected to the frame 14 and, in particular, to the lower frame 18. As can be seen in FIGS. 1 and 2, the drive wheels 26 can be movable between a first position in which the drive wheels 26 are in spaced relationship to the underlying surface 24 and a second position (illustrated in FIG. 2) in which the drive wheels 26 resiliently contact the underlying surface 24. The mechanisms which allow the movement of the drive wheels 26 between the upper position and the lower position will be described in detail in association with FIGS. 3-5. In particular, the drive wheels 26 include a motor 28 that is drivably connected thereto. The motor 28 is in the nature of a DC brush motor. As such, multiple turns of the shaft of the motor 28 can cause a single rotation of the drive wheels 26. The DC brush motor 28 allows the drive wheels 26 to be rotatable in a clockwise direction or in a counterclockwise direction. As such, the drive wheels 26 can facilitate the ability of the hospital bed 10 to move forwardly and backwardly. When the drive wheels 26 are in their upper position, there is no contact between the outer surfaces of the drive wheels 26 and the underlying surface 24. As such, the hospital bed 10 can remain in a stationary position or pushed in a conventional manner. When the drive wheels 26 contact the underlying surface 24, the motion imparted to the drive wheels 26 by the motor 28 causes the drive wheels 26 to contact the underlying surface 24 and thereby move the hospital bed 10 in a desired direction with a desired speed. A control mechanism 30 is connected to the frame 14 and is cooperative with the drive wheels 26 so as to move the drive wheels 26 between the first position (illustrated in FIG. 1) and the second position (illustrated in FIG. 2). The control mechanism 30 includes a handle 32 with a controller 34 mounted at an upper end thereof. The handle 32 includes a first member 36 which extends horizontally outwardly from the upper frame 16. A second member 40 is connected at a lower end thereof to the first member 36. The second member 40 is illustrated as extending in a vertical orientation. A spring-type actuator 42 has one end joined to the first member 36 and an opposite end joined to the second member 40. The spring actuator 42 serves to maintain the second member 40 in a vertical orientation. In normal use, when the handle 32 is released, the spring-type actuator 42 will return the first member 40 to its vertical orientation. A bumper 44 is positioned at the pivotal connection between the first member 36 and the second member 40. Bumper 44 will resist damage to the handle 32 and to exterior surfaces in the event of contact therewith.

The controller 34 includes handgrips 46 extending outwardly therefrom. A paddle member 48 extends outwardly of the controller 34. Paddle member 48 is pivotally connected to the controller 34 so as to be manipulated so as to cause the drive wheels 26 to be rotated in one direction or another. A key actuator 50 extends outwardly of the rear of the controller 34. Key actuator 50 receives a key that serves to activate the drive mechanism of the hospital bed 10. When the key 50 is removed, it is impossible to operate the drive mechanism. The key actuator 50 must receive the key, and have the key turned in order actuate the drive mechanism. A belly switch 52 is positioned at the top of the controller 34 so as to have a surface extending outwardly therefrom. This belly switch 52 serves to stop a rotation of the drive wheels 26 when the belly switch 52 contacts an exterior surface. As such, the belly switch 52 serves as a fail safe mechanism in the event that the hospital bed 10 should move rearwardly in an undesired manner. The controller 34 is suitably connected by electrical lines to the motor 28 and to the actuator which serves to move the drive wheel 26 between their upper position and their lower position.

FIG. 2 illustrates the hospital bed 10 in a position in which the drive wheels 26 have been lowered to a portion contacting the underlying surface 24. As can be seen, the control mechanism 30 has handle 32 extended such that the second member 40 extends at an obtuse angle with respect to the first member 36. In other words, a pulling force applied to the controller 34 and, in particular, upon the handgrips 46 overcomes the resistance of spring actuator 42 so as to allow the user to move the handle 32 into a convenient ergonomic orientation. As such, the user can conveniently "drive" the hospital bed 10 in a desired manner. When the handgrips 46 are released, then the spring-type actuator 42 will return the second member 40 to its generally vertical orientation.

Figure 3:
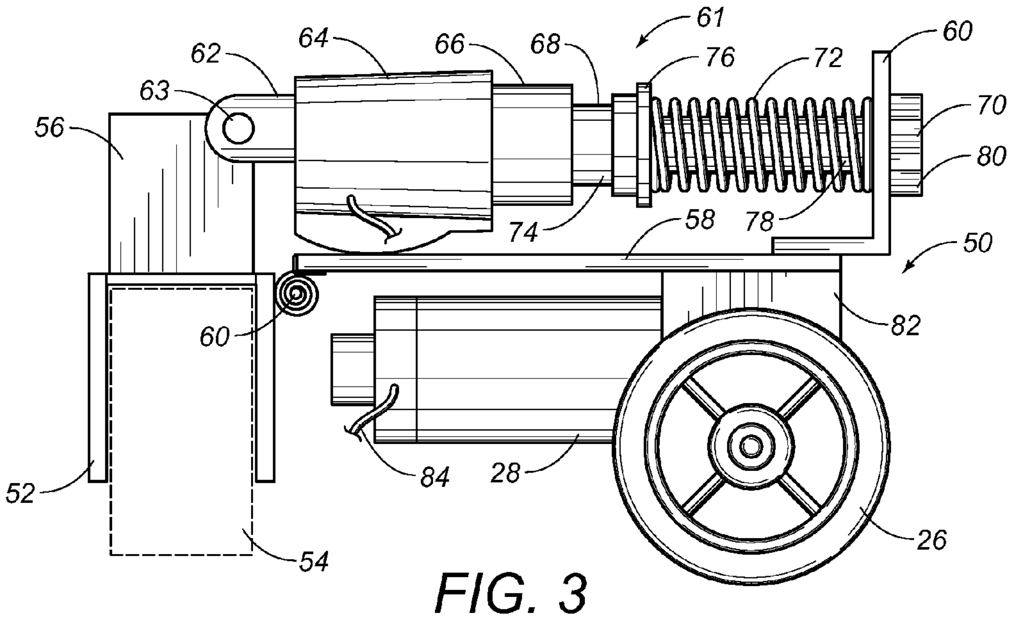
FIG. 3 is an isolated side elevational view of the drive wheels as used in the hospital bed of the present invention in their upper position.

FIG. 3 is a detailed view of the drive wheels 26 and the motor 28 when the drive wheels 26 are in their upper position. As can be seen, a support structure 50 supports the drive wheels 26 and the motor 28. The support structure 50 includes a channel member 52 having an inverted U-shape construction that can be secured, by conventional means, onto a cross member 54 associated with the hospital bed 10. In other words, the channel member 52 will overly the periphery of the cross member 54 so as to establish a strong securing engagement therewith. A flange 56 will extend upwardly from the channel member 52. A panel 58 is pivotally connected by hinge 60 to the channel member 52. The drive wheels 26 and the motor 28 are supported beneath the panel 58. The panel 58 includes a flange surface 60 extending upwardly and outwardly therefrom. This flange surface 60 is in the nature of an angle member that is affixed to the upper surface of the panel 58 at an end opposite the hinge 60 and the channel member 52. An actuator means 61 is cooperative with the channel member 52 and with the panel 58 for moving the panel 58 and the drive wheels 26 between the upper position and the lower position. In particular, a clevis 62 is pivotally connected at pivot 63 to the flange 56 extending upwardly from the channel member 52. A housing 64 is pivotally connected by the clevis 62 to the flange 56. An actuator 66 is positioned within the housing 64. The actuator 66 includes a piston 68 that extends outwardly of the housing 64. The piston 68 has an end 70 opposite the housing 64 that is received by the flange surface 60 of the panel 58. A spring 72 extends between the housing 64 and the flange surface 60 so as to resiliently contact the flange surface 60. The piston 68 is slidable relationship relative to the flange surface 60 of panel 58. The spring 72 resiliently urges the panel 58 pivotally downwardly relative to the frame 14 of the hospital bed 10 such that the drive wheels 26 can be moved to the lower position. The piston 68 is generally freely slidable through the flange surface 60 of the panel 58. The piston 68 includes a drive piston 74 that directly extends outwardly of the housing 64. A support flange 76 is affixed to an end of the drive piston 74 at an end opposite the housing 64. A pair of rods 78 are affixed to a side of the support flange 76 opposite the drive piston 74. The spring 72 extends over and along the pair of rods 78. A nut 80 is affixed to the end of the rod 78 opposite the support flange 76 and a side of the flange surface 60 opposite the spring 72. Nut 80 serves to limit the inward movement of the rod 78. The spring 72 will bear against the flange surface 60 so as to urge the panel 58 toward the downward position. The force of the contact between the nut 80 and the flange surface 60 will overcome the force of the spring 72 so as to maintain the drive wheels 26 in their upper position.

In FIG. 3, it can be seen that a axle housing 82 extends downwardly from the plate 58 so as to allow the drive wheels 26 to be rotatably mounted thereto. Similarly, the axle housing 82 will also receive an end of the drive motor 28 therein. A suitable electrical line 84 can extend from the drive motor 28 to the controller 34 and to the power supply of the hospital bed 10.

Figure 4:
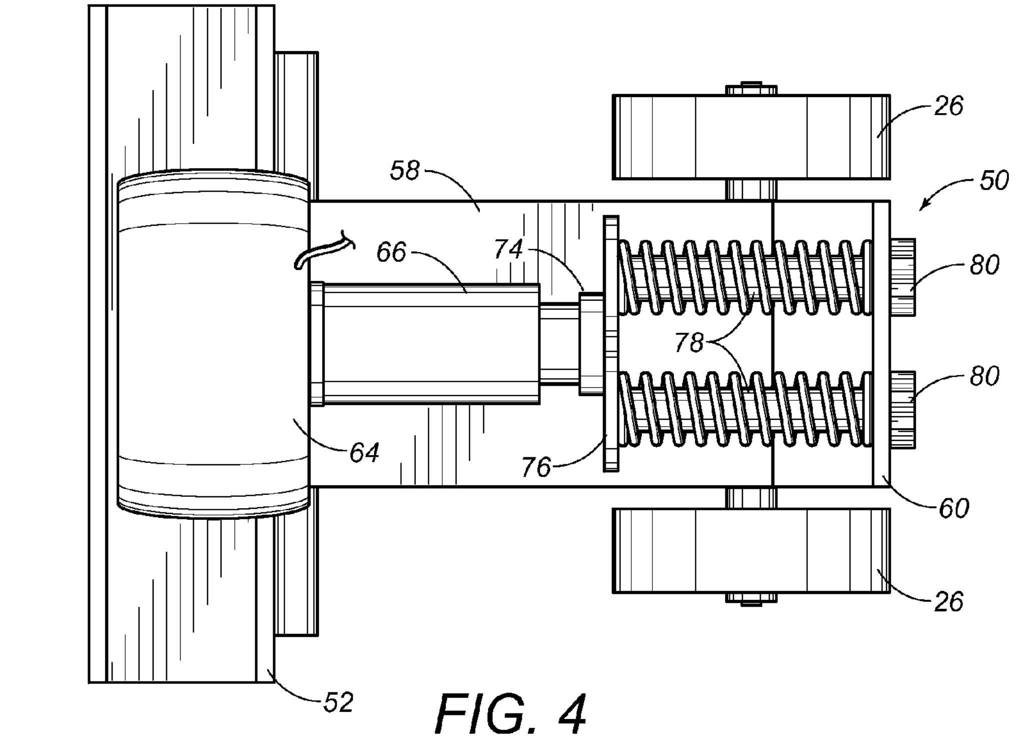
FIG. 4 is a plan view of the drive wheels of the present invention.

FIG. 4 shows a plan view of the support structure 50. In particular, in FIG. 4 it an be seen that the drive wheel 26 comprises a pair of which wheels extend outwardly from opposite sides of the plate 58. Furthermore, it can be seen that there are pair of rods 78 which extend in generally parallel relationship to each other and through the flange surface 60 of the plate 58. A pair of nuts 80 abut the opposite side of the flange surface 60 from the spring 78.

In FIG. 4, it can be seen that the housing 64 is pivotally connected to the channel member 52. Actuator 66 extends outwardly therefrom. The drive piston 74 directly extends from the actuator 66 and is joined to the support flange 76. The use of a pair of rods 78 assures against any twisting motion imparted during the movement of the drive wheels 26 between their upper position and their lower position. Additionally, the resilient forces exerted by spring 78 are distributed over a wider surface of the flange surface 60. Although it is possible within the concept of the present invention that a single rod 78 can be used, it believed that the pair of rods 78 distributes forces more evenly, avoids twisting forces, and serves to move the drive wheels 26 in a more efficient and convenient manner.

Figure 5:
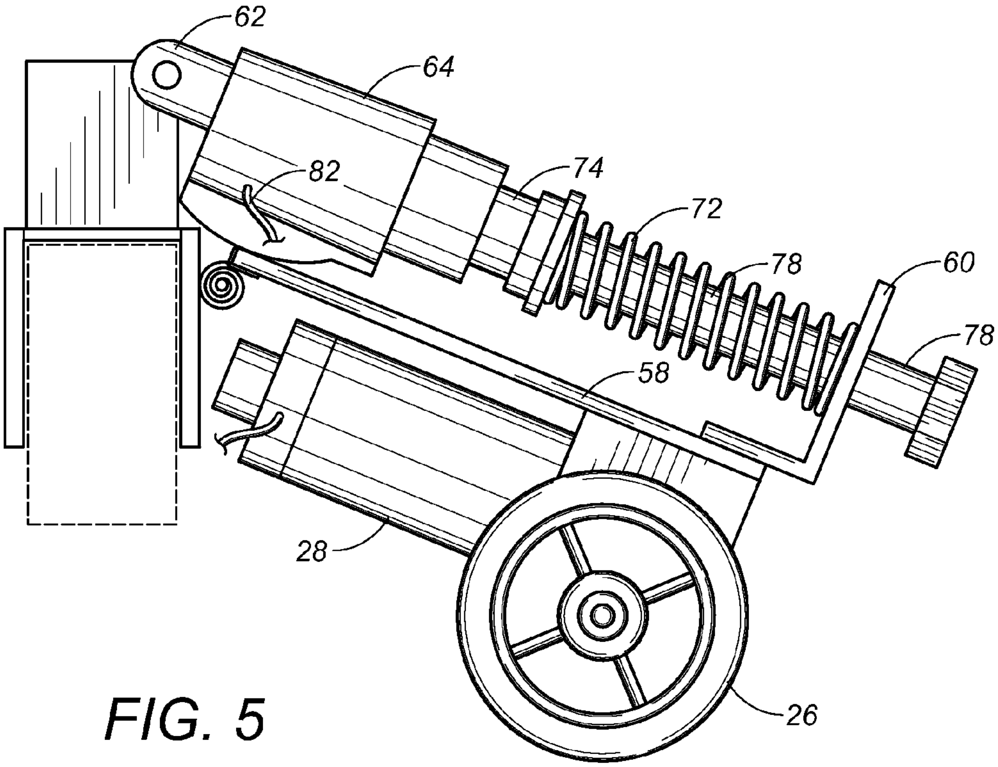
FIG. 5 is a side elevational view showing the drive wheels of the present invention in their lowered position.

FIG. 5 illustrates the drive wheels 26 in their lower position. In FIG. 5, it can be seen that the clevis 62 of the housing 64 is pivoted angularly downwardly. This is the result of the movement of the rod 78 generally outwardly by action of the outward movement of the drive piston 74. As can be seen, the spring 72 is exerting a relatively strong force against the flange surface 60. This causes the plate 58 and the attached drive wheels 26 and motor 28 to pivot downwardly. A portion of the rod 78 extends outwardly on the opposite side of the support flange 60. As a result, the spring 72 directly resiliently urges the drive wheels 26 downwardly. Any bouncing force encountered by the drive wheels 26 on the underlying surface or any uneven surfaces encountered by the drive wheels 26 can be absorbed by the spring 72 in a natural manner. Suitable electrical lines 82 connect with the actuator 64 so as to cause the drive piston 74 to move outwardly.

Figure 6:
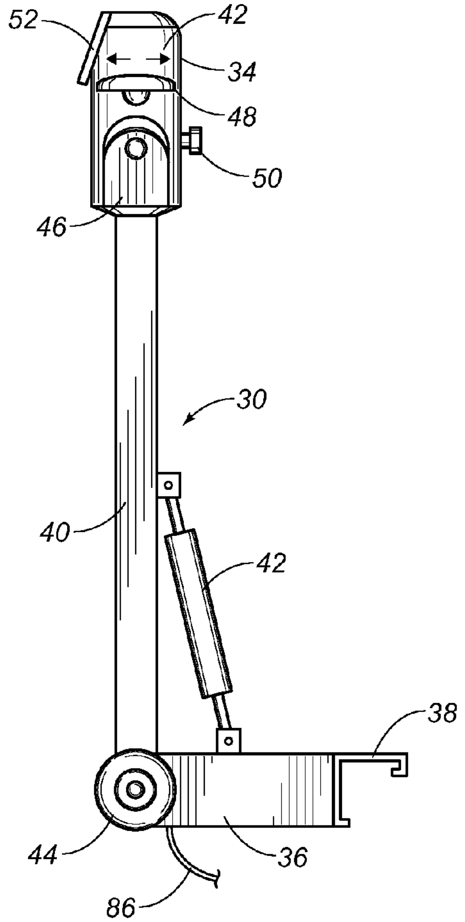
FIG. 6 is a isolated side elevational view of the control handle of the present invention.

FIG. 6 is an isolated view showing the control mechanism 30 of the present invention. Control mechanism 30 includes a channel member 38 which can be secured to a cross member of the hospital bed 10. The first member 36 extends from the channel member 38. The second member 40 extends vertically upwardly from the first member 36. A generally wheel-type bumper 34 is located at the intersection of the first member 36 with the second member 40. Spring-type actuator 42 also extends angularly between the first member 36 and second member 40. Controller 34 is located at the upper end of the second member 40. Controller 34 includes the belly switch 52, the paddle switch 48 and the key actuator 50 thereon. Handgrips 46 extend radially outwardly of the controller 34. Arrows 84 illustrate the relative movement of the hospital bed 10 relative to the movement of the paddle member 44 about its pivot axis. Electrical line 86 is illustrated as extending outwardly of the control mechanism 30 for connection to the motor 28 and to the other circuitry associated with the hospital bed 10.

Figure 7:
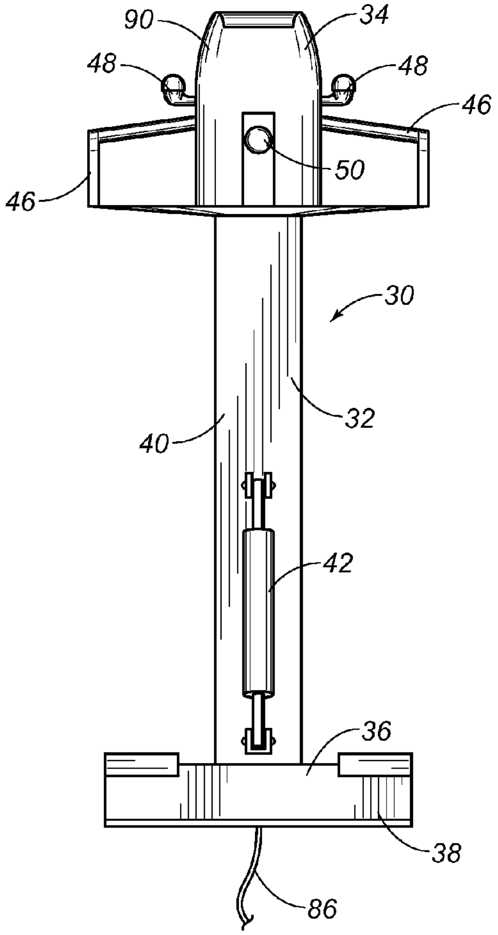
FIG. 7 is an end view of the isolated handle controller as used in the present invention.

FIG. 7 is an end view of the control mechanism 30. In particular, in FIG. 7, it can be seen that the controller 34 has paddle members 48 extending outwardly on opposite sides of the housing 90 of the controller 34. Handgrips 46 also extend radially outwardly on opposite sides of the housing 90. The belly switch 52 is illustrated as extending across the top of the housing 90. The key actuator 50 is located on a central surface of the controller 34 for easy access by the user of the hospital bed 10 of the present invention.

In FIG. 7, it can be seen that the channel member 38 has a suitable structure for engaging the cross member associated with the hospital bed in a conventional manner. Both the channel members used for the drive wheels 26 and for the control mechanism 30 can be readily adapted to many shapes and sizes of hospital beds. It is relatively easy to attach the channel members to cross members associated with such hospital beds.

In FIG. 7, it can be seen that the spring-type actuator 42 has one end connected to the first member 36 and an opposite end connected to the second member 40 of the handle 32.

Figure 8:
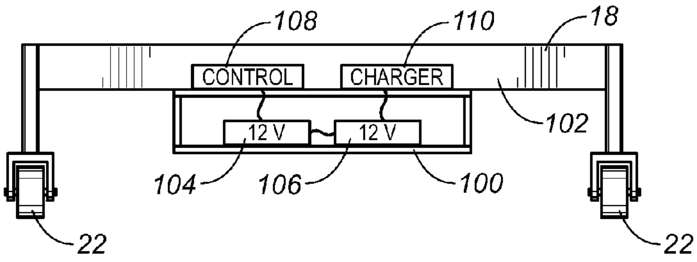
FIG. 8 is an end view of the hospital bed of the present invention showing, in particular, the arrangement of power supply, control circuitry, and charger mechanisms.

FIG. 8 shows an end view of the lower frame 18 of the hospital bed. In particular, it can be seen that wheels 22 are in the nature of casters that extend downwardly from the lower frame 18 in a conventional manner. A housing 100 is affixed to the cross member 102 of the lower frame 18. Housing 100 includes 12 volt batteries 104 and 106 connected together in series. As such, the output of the batteries 104 and 106 is 24 volts. This enhances the power available for the operation of the hospital bed of the present invention. Control circuitry 108 is supported on the top of housing 100. Similarly, a charger 110 can be connected to the batteries 104 and 106 so as to allow for a recharging of the batteries 104 and 106 from the natural power supply provide to the hospital bed 10. A suitable cover can be applied over her control circuitry 108, the charger 110, and over the housing 100 so as to enclose each of these items in a safe environment.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. A power-assist apparatus comprising:

a bed having a frame extending therebelow and having a wheel rotatably mounted thereto so as to support the frame above an underlying surface;

a drive wheel interconnected to said frame, said drive wheel movable between a first position which said drive wheel is positioned in spaced relationship to the underlying surface and a second position in which said drive wheel resiliently contacts the underlying surface;

a control means cooperative with said drive wheel so as to move said drive wheel between said first position and said second position;

a motor drivably connected to said drive wheel; and a support structure affixed to said frame of said bed, said motor affixed to said support structure, said drive wheel being rotatable relative to said support structure, said support structure comprising:

a channel member affixed to a cross-member of said frame of said bed;

a panel pivotally connected to said channel member, said motor and said drive wheel being supported beneath said panel; and an actuator means cooperative with said channel member and said panel, said actuator means for moving said panel and said drive wheel between said first and second positions, said actuator means comprising:

a housing pivotally connected to one end of said channel member; and an actuator positioned in said housing, said actuator having a piston extending outwardly of said housing, said piston having an end opposite said housing received by a surface of said panel; and a spring extending between said housing and said surface of said panel so as to resiliently contact said surface of said panel, said piston being in slidable relationship to said surface of said panel, said spring resiliently urging said panel pivotally downwardly relative to said frame of said bed such that said drive wheel is in said second position, said piston generally being freely slidable through said surface of said panel, said piston comprising:

a drive piston extending outwardly of housing;

a support flange affixed to an end of said drive piston opposite said housing; and a pair of rods affixed to a side of said support flange opposite said drive piston, said pair of rods extending in generally parallel relationship to each other, said spring comprising a pair of springs extending respectively over and along said pair of rods.

2. The apparatus of claim 1, said surface of said panel being a flange surface extending upwardly from said panel at an end opposite said channel member, said flange surface having a pair of holes formed therein, said pair of rods respectively extending through said pair of holes, said pair of springs respectively bearing against said flange surface.

3. The apparatus of claim 1, said drive wheel comprising a pair of wheels extending outwardly respectively on opposite sides of said panel.

4. The apparatus of claim 1, said actuator comprising a lead screw drive actuator.

5. The apparatus of claim 1, said motor being a DC brush motor, said motor connected to said drive wheel such that a multiple rotation of said motor causes a single rotation of said drive wheel when said drive wheel is in said second position.

6. The apparatus of claim 1, said control means comprising:

a handle connected to frame of said bed; and a controller affixed to an upper end of said handle, said controller being electrically connected to said motor.

7. The apparatus of claim 6, said handle being pivotally connected at a lower end thereof to said frame of said bed so as to move between a vertical orientation and a non-vertical orientation.

8. The apparatus of claim 7, said handle comprising:

a first member having an end affixed to said frame of said bed and extending generally horizontally outwardly therefrom;

a second member pivotally connected to an end of said first member opposite said frame, said controller affixed to an end of said second member opposite said first member; and a spring means connected to said first and second members for resiliently urging said second member toward said vertical orientation.

9. The apparatus of claim 8, said handle further comprising:

a bumper mounted to said handle at the pivotal connection of said first member with said second member.

10. The apparatus of claim 6, said controller comprising:

a paddle member pivotally connected to said handle, said paddle member pivotable so as to cause said drive wheel to be rotated by said motor in one direction or another direction.

11. The apparatus of claim 6, said controller comprising:

a switch means positioned at said upper end of said handle, said switch means for stopping a rotation of said drive wheel by said motor when said switch means is contacted by an exterior surface.

12. The apparatus of claim 6, said controller further comprising:

a key actuator mounted at said upper end of said handle, said key actuator movable between an on position and an off position.

13. The apparatus of claim 8, further comprising:

an electrical power supply mounted on said frame of said bed, said power supply being electrically connected to said motor and to said control means.

14. The apparatus of claim 13, said power support being a 24 volt power supply.

* * * * *